Figure 1:
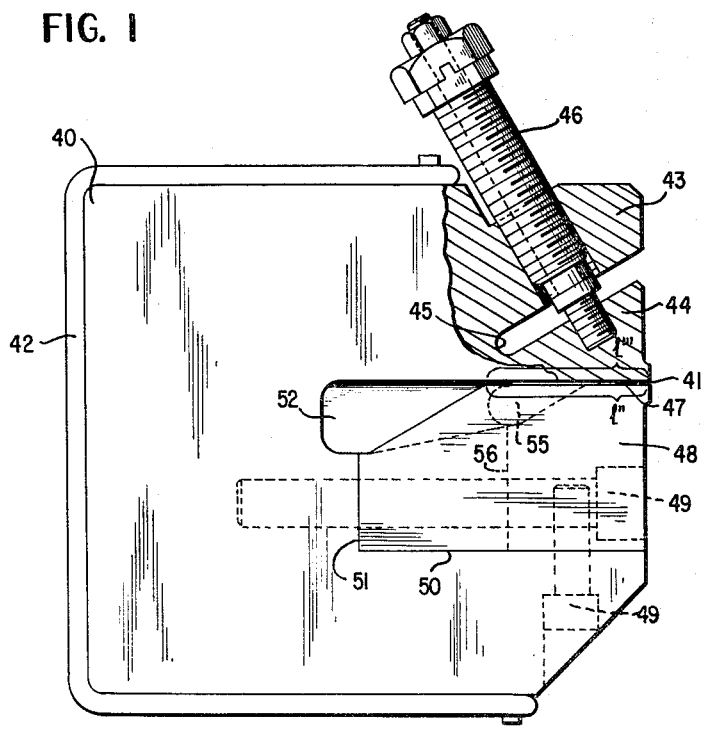

Dec. 29, 1964  W. A. SEUBERT  3,162,896
EXTRUSION DIE
Filed April 9, 1962

INVENTOR.
WILLIAM A. SEUBERT
BY
*James C. Arvantes*
ATTORNEY

United States Patent Office 3,162,896
Patented Dec. 29, 1964

3,162,896
EXTRUSION DIE
William A. Seubert, Trenton, N.J., assignor to Union
Carbide Corporation, a corporation of New York
Filed Apr. 9, 1962, Ser. No. 185,924
3 Claims. (Cl. 18—12)

This invention relates to an extrusion die. More specifically, this invention relates to a flat film and sheet forming extrusion die that can be readily and easily cleaned and from which plastic material, having undergone no undesirable thermal degradation, can be extruded.

A problem of long standing in the plastic's industry has been the difficulty in extruding rigid polyvinyl chloride which has not undergone any undesirable thermal degradation in the extrusion die. This problem is due, in part, to the limited heat stability, at extrusion temperatures, of rigid polyvinyl chloride. Rigid polyvinyl chloride, that is polyvinyl chloride having a Tensile Modulus (ASTM D-882-54TC) in excess of about 310,000 p.s.i., is normally extruded while at a temperature of about 175° C. to about 190° C. At a temperature below about 175° C. rigid polyvinyl chloride is not a homogeneously molten material and is not readily extrudable. While at a temperature in excess of about 190° C. rigid polyvinyl chloride tends to thermally decompose.

It has been observed, however, that when rigid polyvinyl chloride and other similar thermoplastics dwell at their extrusion temperatures, they undergo undesirable thermal degradation in a relatively short period of time. Thermal degradation results in discoloration and decomposition of the thermoplastic which is being extruded with accompanying formation of gel specks in the thermoplastic material. For example, extrusion of rigid polyvinyl chloride through a sheet extrusion die, having a large-volume distributor channel of constant cross-sectional area, results in the thermoplastic material stagnating within the distributor channel, particularly at the extremities thereof. Consequently, the dwell time of the thermoplastic material which has stagnated in the distributor channel of the extrusion die is relatively long. As a consequence, the stagnant thermoplastic material thermally decomposes, flakes into and contaminates the freely flowing thermoplastic material resulting in the extruded sheet material being discolored and containing undesirable gel specks.

To cope with the problem of thermal degradation, it has been proposed to streamline the internal flow passages of extrusion dies in order to decrease the dwell time and to eliminate areas of stagnation of the thermoplastic material therein. "Streamlining" involves providing an extrusion die with a distributor channel, in communication with the feed inlet and the orifice of the extrusion die, which progressively decreases in cross-sectional area from the feed inlet to its extremities.

However, a serious problem arises as a consequence to the use of conventional streamlined dies in those instances wherein rigid polyvinyl chloride is being extruded. At normal extrusion temperatures, rigid polyvinyl chloride is highly viscous and relatively high pressures are required in order to extrude this thermoplastic. As an illustration, at a temperature of 180° C. rigid polyvinyl chloride has an apparent viscosity of 0.220 lbs. sec./inch$^2$ at a shear rate of 200 sec.$^{-1}$ and a pressure of about 3,000 to about 6,000 p.s.i. is required in order to extrude this thermoplastic through a die orifice having an opening of 90 mils. As compared to these relatively high pressures, a pressure of only about 1,000 p.s.i. is required in order to extrude a sheet of the same thickness from the same extrusion die using polyethylene.

As a result of the relatively high extrusion pressures required in order to extrude rigid polyvinyl chloride, relatively large forces are developed within the extrusion die, especially in streamlined extrusion dies wherein the internal die area is substantially greater than in non-streamlined extrusion dies. Development of relatively large internal forces is especially troublesome in extrusion dies which are currently available as these dies are often "sprung" by these forces. As a rule, these extrusion dies are made of two metal halves which are bolted together by a series of bolts. Currently available extrusion dies do not have the strength to successfully resist forces developed therein, particularly during the extrusion of rigid polyvinyl chloride.

It is an object of the present invention to provide an extrusion die for the extrusion of flat film and sheet material that possesses sufficient strength to withstand the forces developed therein during the extrusion of highly viscous thermoplastics, such as rigid polyvinyl chloride and that is so streamlined that undesirable stagnation and resultant degradation of thermoplastic material therein is eliminated.

It is also an object of this invention to provide an extrusion die that can be easily and quickly cleaned and from which flat film and sheet material characterized by uniform thickness can be extruded.

Accordingly, my invention provides a flat film and sheet extrusion die which has a unitary die body, a feed inlet into the die body through which material enters, a distributor channel, in communication with the feed inlet, into which material enters from the feed inlet and from which material is discharged, a passageway in communication with the distributor channel, forming at its tip the die orifice of the extrusion die, defined between the land of the adjustable, upper die lip member and the land of the removable lower die lip member of the extrusion die, the lower die lip member extending into and supported along its base by the die body and in conjunction with the interior walls of the die body defining the aforementioned distributor channel, the cross-sectional area of the distributor channel progressively decreasing from the feed inlet to the extremities thereof.

The present invention is more fully described by the description which follows taken in conjunction with the accompanying drawing wherein:

FIGURE 1 is an end view in elevation and partially in section of the extrusion die of the present invention at the feed end thereof.

Specifically referring to FIGURE 1, the extrusion die of the present invention is shown to include a unitary die body 40 which has a feed inlet at an end of die body 40, through which material enters, a distributor channel 52, in communication with the feed inlet and with die orifice 41, which receives material from the feed inlet and discharges this material to die orifice 41 from whence the material is extruded in the form of flat film or sheeting.

The extrusion die, as shown in FIGURE 1, at its end opposite the feed inlet is provided with end plate 55. In the accompanying drawing, the extrusion die has an end feed and consequently one end plate at the opposite end thereof. In those instances wherein the extrusion die has a center feed, each end of the extrusion die will be provided with an end plate. If desired, each end plate can be provided with a bleeder valve.

Distributor channel identified in FIGURE 1 by numeral 52 is shown to be of a general tear drop configuration with the cross-sectional area thereof progressively decreasing from the feed inlet to the extremity of the distributor channel. The configuration of the distributor channel is not critical and can also be, for example, elliptical, rectangular or circular. Also, the configuration of the distributor channel at its feed inlet can be the same or can be of a different configuration than that at its extremities. In all instances, however, the cross-sectional area of the distributor channel progressively decreases from the feed inlet of the extrusion die to an extremity of the distributor channel. In those instances wherein the extrusion die has a center feed, that is a feed intermediate its ends, the cross-sectional area of the distributor channel progressively decreases from the feed inlet to each extremity of the distributor channel.

Upper die lip member, identified in FIGURE 1 by numeral 44, is an integral part of the die body as is shown in FIGURE 1.

In FIGURE 1, the upper die lip member, identified by numeral 44, is an integral part of die body 40, and extends under and is spaced from member 43 which is also an integral part of die body 40. Upper die lip member 44 and rigid member 43 are connected at a number of convenient locations at their extremities by "push-pull" bolt assemblies 46. The opening of the die orifice 41 is regulated by adjusting bolt assemblies 46 to flex upper die lip member 44 at point 45. Land $l'''$ of upper die lip member 44 in conjunction with land $l''$ of lower die lip member 48 define therebetween passageway 47 which at its tip forms die orifice 41.

Temperature of the thermoplastic material, as it is passing through the extrusion die, is conveniently determined by placing immersion thermocouples (not shown) in proximity of the flowing thermoplastic material. As a rule, the thermocouple or thermocouples (not shown) are mounted in the die body, in a close relationship to the flow channels of the extrusion die.

In order to maintain the thermoplastic material at the desired temperature, the extrusion die can be provided with one or more suitable heaters, as for example, an electrical band heater as is shown in FIGURE 1 and identified by numeral 42.

FIGURE 1 shows the extrusion die of the present invention provided with a removable, lower die lip member whose land width progressively decreases from the feed inlet of the extrusion die to an extremity of the distributor channel. By providing an extrusion die with a removable lower die lip member whose land width progressively decreases from the feed inlet of the extrusion die to an extremity of the distributor channel, an extrusion die is obtained which not only has the advantageous features previously discussed, but in addition, is one in which the pressure forcing the thermoplastic material into and through the die orifice is substantially equal at all points of the die orifice. With such an extrusion die, flat film and sheet material of excellent quality are obtained in that they are characterized by uniform thickness and require no additional finishing in order to be acceptable for commercial use.

Referring specifically to FIGURE 1, there is shown an extrusion die having a unitary die body 40 which has a feed inlet (not shown) at an end thereof through which material enters into the extrusion die and flows into distributor channel 52. Distributor channel 52 is in communication with passageway 47 which is defined between land $l'''$ of adjustable upper die lip member 44 and land $l''$ of removable, lower die lip member 48, and forms at its tip die orifice 41.

Removable, lower die lip member 48 extends into die body 40 and rests along its base, indicated by line 50, on the lower internal surface of die body 40 and abuts the perpendicular wall of die body 40 along line 51. Bolts 49 serve as a convenient means of holding removable, lower die lip member 48 in abutting contact with die body 40 in a manner as described previously.

Land $l''$ of lower die lip member 48 progressively decreases in width from the feed inlet of the extrusion die to the extremity of distributor channel 52, bounded by end plate 55. Utilizing an extrusion die having a feed inlet intermediate its ends, the land of the lower die lip member would decrease in width from the feed inlet to each extremity of the distributor channel. Dotted line 56 in FIGURE 1 indicates the decreases in width of lower die lip member 48 from the feed inlet (not shown) to the extremity of the distributor channel. Passageway 47 will also progressively decrease as land $l''$ decreases.

In extruding thermoplastic material, the material is continuously fed, under pressure and at normal extrusion temperatures through the feed inlet of the extrusion die into the distributor channel. The thermoplastic material flows into and along the distributor channel, then passes into the passageway, which forms at its tip the die orifice, and then passes into and is extruded from the die orifice.

For purposes of cleaning the extrusion die, the flow of thermoplastic material into the extrusion die is stopped and the lower die lip member removed, thereby providing clear access to the interior of the die.

What is claimed is:

1. An extrusion die having a unitary die body, a feed inlet into said die body thru which plastic material enters, a die orifice from which plastic material is extruded, an upper die lip member, a removable lower die lip member, a distributor channel in communication with said feed inlet into which plastic material enters from said feed inlet and from which plastic material is discharged, the cross-sectional area of said distributor channel progressively decreasing from said feed inlet to the extremities thereof, a passageway in communication with said distributor channel defined between the land of said upper die lip member and the land of said removable lower die lip member, said passageway forming at its tip the die orifice of said extrusion die, said upper die lip member being an integral part of said unitary die body and flexibly adjustable with respect to said removable lower die lip member to regulate the dimensions of said die orifice, said removable lower die lip member extending into and supported along its base by said unitary die body and in conjunction with the interior walls of said unitary die body, defining said distributor channel.

2. The extrusion die as defined in claim 1 wherein the land of said removable lower die lip member progressively decreases in width from said feed inlet to the extremities of said distributor channel.

3. The extrusion die as defined in claim 1 wherein the interior walls of said unitary die body include a wall perpendicular to the base of said removable lower die lip member against which said removable lower die lip member abuts.

References Cited in the file of this patent
UNITED STATES PATENTS

| | | |
|---|---|---|
| 2,479,804 | Bailey et al. | Aug. 23, 1949 |
| 2,628,386 | Tornberg | Feb. 17, 1953 |
| 2,686,931 | Knox | Aug. 24, 1954 |
| 2,709,834 | Johnson | June 7, 1955 |
| 2,897,541 | Orsini | Aug. 4, 1959 |
| 2,923,971 | Nelson | Feb. 9, 1960 |
| 2,971,222 | Weissman | Feb. 12, 1961 |
| 3,000,054 | Seifried et al. | Sept. 19, 1961 |
| 3,039,143 | Nicholson | June 19, 1962 |
| 3,063,095 | Limbach | Nov. 13, 1962 |
| 3,072,962 | McDermott et al. | Jan. 15, 1963 |
| 3,074,106 | Eberman | Jan. 22, 1963 |

FOREIGN PATENTS

| | | |
|---|---|---|
| 167,559 | Australia | Apr. 26, 1956 |
| 551,760 | Belgium | Oct. 31, 1956 |
| 841,501 | Great Britain | July 13, 1960 |
| 853,546 | Great Britain | Nov. 9, 1960 |

OTHER REFERENCES

Schenkel, G. P.: International Plastics Engineering, October 1961, page 453.